US012690573B2

(12) United States Patent
Takemoto et al.

(10) Patent No.: US 12,690,573 B2
(45) Date of Patent: Jul. 28, 2026

(54) LURE

(71) Applicant: Shimano Inc., Sakai City (JP)

(72) Inventors: Yoshiyuki Takemoto, Sakai City (JP);
Kazuto Nakamura, Sakai City (JP)

(73) Assignee: SHIMANO INC., Sakai City (JP)

( * ) Notice: Subject to any disclaimer, the term of this
patent is extended or adjusted under 35
U.S.C. 154(b) by 0 days.

(21) Appl. No.: 19/005,888

(22) Filed: Dec. 30, 2024

(65) Prior Publication Data

US 2025/0280809 A1      Sep. 11, 2025

(30) Foreign Application Priority Data

Mar. 7, 2024   (JP) ................................. 2024-035194
Mar. 7, 2024   (JP) ................................. 2024-035195

(51) Int. Cl.
*A01K 85/00*   (2006.01)
(52) U.S. Cl.
CPC ...... *A01K 85/1863* (2022.02); *A01K 85/1837*
(2022.02); *A01K 85/1847* (2022.02)

(58) Field of Classification Search
CPC ........... A01K 85/1837; A01K 85/1841; A01K
85/1843; A01K 85/1847; A01K 85/1863;
A01K 85/1873; A01K 85/1883
See application file for complete search history.

(56) References Cited

U.S. PATENT DOCUMENTS 11,785,927 B2   10/2023   Yamane et al.
2021/0386043 A1 *   12/2021   Yamane ................. A01K 85/16
2023/0189776 A1 *   6/2023   Kawasaki ............. A01K 85/00
2023/0397588 A1 *   12/2023   Ahmed .................. A01K 85/00

FOREIGN PATENT DOCUMENTS

JP     55430677 B2    4/2014
JP     2021193921 A    12/2021

* cited by examiner

*Primary Examiner* — Joshua J Michener
*Assistant Examiner* — Henry Hooper Mudd
(74) *Attorney, Agent, or Firm* — United IP Counselors,
LLC

(57) ABSTRACT

A lure 1 includes a body 3, a support 5, and a weight 7. The
body 3 includes a head 13a in its front portion and a tail 13b
in its rear portion. The support 5 extends in the front-rear
direction inside the body 3. The weight 7 is supported by the
support 5 so as to be movable in the front-rear direction. At
least part of the weight 7 is movable in a transverse direction
that intersects with the front-rear direction.

10 Claims, 13 Drawing Sheets

REAR

UP ⟷ DOWN

FRONT

Fig. 8

LURE

CROSS-REFERENCE TO RELATED APPLICATIONS

This application claims priority to Japanese Patent Application No. 2024-35194, filed Mar. 7, 2024, and Japanese Patent Application No. 2024-35195 filed Mar. 7, 2024. The contents of those applications are incorporated by reference herein in their entirety.

TECHNICAL FIELD

The claimed invention relates to lures.

BACKGROUND ART

The lure described in Japanese Patent Publication No. 2021-193921 includes a body, a shaft, a weighted element, and an elastic member. The shaft is comprised of straight wire material. The shaft extends linearly in the front-rear direction inside the body. The weighted element is supported by a guide member inside the body so as to be movable in the front-rear direction. The elastic member urges the weighted element forward.

In this type of lure, when the lure is cast, the weighted element moves linearly toward the tail of the body along the shaft by inertia while compressing the elastic member. When the lure hits the water, the weighted element is pushed linearly back toward the head of the body along the shaft by the urging force of the elastic member. The movement of the weighted element suitably maintains the posture of the lure when the lure is cast and the posture when it hits the water. While the lure is moving through the water, the weighted element moves linearly in the front-rear direction along the shaft in response to an external force applied to the lure.

BRIEF SUMMARY

In the lure described in Japanese Patent Publication No. 2021-193921, the shaft is linear in shape. In this case, the movement path of the weighted element is restricted to a linear trajectory. Thus, depending on the shape and internal structure of the lure, it might be difficult to place the weighted element in an optimal position. In other words, the degree of freedom of the weighted element's movement path is limited to a straight line, thereby making it difficult to place the center of gravity of the lure at a position the designer desires.

The lure described in Japanese Patent No. 5530677 includes a body, a guide wire, a first weighted element, a second weighted element heavier than the first weighted element, and a step portion. The guide wire extends linearly in the front-rear direction inside the body. The first weighted element is positioned behind the second weighted element inside the body. The second weighted element is supported by the guide wire inside the body so as to be movable in the front-rear direction.

In this type of lure, when the lure is cast, the first and second weighted elements move linearly along the guide wire toward the tail of the body due to inertial force. When the lure hits the water, the first and second weighted elements move linearly along the guide wire toward the head of the body. While the lure is moving through the water, the first weighted element is positioned between the second weighted element and the step portion, thereby restricting the second weighted element from moving backward during movement through the water.

In the conventional lure, the first weighted element is positioned between the second weighted element and the step portion, so that the center of gravity of the lure is adjusted toward the head while the lure is moving through the water. In this case, the first weighted element and the second weighted element move independently. As a result, there is a risk that, when the second weighted element moves toward the head, the first weighted element may not follow it and may not be positioned between the second weighted element and the step portion. In addition, to prohibit the first weighted element from exceeding the step portion while the lure is moving through the water, the design is required to adjust the weight and diameter of the first weighted element through trial and error.

The claimed invention aims to provide a lure whose center of gravity can be adjusted appropriately. The claimed invention also aims to provide a lure whose center of gravity can be stabilized while moving through the water.

In a first aspect of the claimed invention, the lure includes a body, a support, and a weight. The body has a head in its front portion and a tail in its rear portion. The support extends in the front-rear direction inside the body. The weight is supported by the support so as to be movable in the front-rear direction. At least part of the weight is movable in a transverse direction that intersects the front-rear direction.

In this lure, because the weight is movable in the transverse direction, the degree of freedom in the weight's movement path can be enhanced compared to the prior art. Consequently, the center of gravity of the lure can be appropriately adjusted. Furthermore, the center of gravity while the lure is moving through the water can be stabilized with a simple configuration.

In a second aspect of the claimed invention, the lure according to the first aspect may be configured as follows: The support is supported by the body so as to be movable in the transverse direction.

In this lure, the support is movable in the transverse direction, and the weight is supported by the support so as to be movable in the front-rear direction. As a result, when the support moves in the transverse direction, the weight also moves in the transverse direction together with the support. That is, the center of gravity of the lure can be appropriately adjusted. Furthermore, the weight moves both in the front-rear direction and the transverse direction in response to the action (e.g., winding operation) performed by the angler, and thereby allowing the lure to behave irregularly.

In a third aspect of the claimed invention, the lure according to the second aspect may be configured as follows: The support is an axial member with a shaft-like shape. The axial member is able to oscillate around the tail side. With this configuration, oscillation of the weight supported by the support enhances the degree of freedom of the movement path of the weight.

In a fourth aspect of the claimed invention, the lure according to the third aspect may be configured as follows: The axial member includes a front-end portion disposed on the head side and a rear-end portion disposed on the tail side and supported by the body to be able to oscillate. The body has a groove for guiding the front-end portion in the transverse direction. With this configuration, the front-end portion of the axial member is guided in the transverse direction by the groove of the body, so that the weight supported by the support can move stably in the transverse direction.

In a fifth aspect of the claimed invention, the lure according to the second aspect may further include an urging member. The urging member urges the weight at least forward. This configuration facilitates returning of the weight toward the head.

In a sixth aspect of the claimed invention, the lure according to the first aspect may further include a restricting portion. The restricting portion is configured to limit the weight from moving rearward. The restricting portion is positioned on an inner surface of the body in the front portion of the body. The weight is restricted by the restricting portion when at least part of the weight moves in the transverse direction.

In this lure, the weight is restricted by the restricting portion as it moves at least partially in the transverse direction. Consequently, in this lure, the restricting portion in the front portion of the body easily restricts the weight from moving rearward. In other words, the center of gravity of the lure can be stabilized with a simple structure while the lure is moving through the water.

In a seventh aspect of the claimed invention, the lure according to the sixth aspect may be configured as follows: The support is supported by the body so as to be movable in the transverse direction. When the support moves in the transverse direction, the weight is restricted by the restricting portion. This configuration allows the weight to engage with the restricting portion, which reliably restricts the weight from moving rearward.

In an eighth aspect of the claimed invention, the lure according to the seventh aspect may be configured as follows: The restricting portion is a recess formed on the inner surface of the body. With this configuration, the engagement of the weight with the recess ensures the restriction of rearward movement of the weight.

In a ninth aspect of the claimed invention, the lure according to the eighth aspect may further include a magnet. The magnet is positioned on the body so as to face the recess with the support in between. The weight is at least partially comprised of magnetic material. With this configuration, the engagement between the weight and the recess can be easily released by the magnetic force of the magnet. Additionally, the disengagement state between the weight and the recess can be suitably maintained.

In a tenth aspect of the claimed invention, the lure according to the ninth aspect may be configured as follows: The support is an axial member with a shaft-like shape. The axial member is able to oscillate around the tail side. This configuration facilitates the movement of the weight toward the magnet.

In an eleventh aspect of the claimed invention, the lure according to the seventh or eighth aspect may further include an urging member. The urging member urges the weight at least forward. This configuration facilitates returning of the weight toward the head.

In a twelfth aspect of the claimed invention, the lure according to the sixth aspect may be configured as follows: The weight includes a weight body and a sliding portion. The restricting portion includes a slope that inclines toward an outer surface of the body. When at least part of the weight moves in the transverse direction, the sliding portion comes into contact with the slope, and the slope restricts the weight from moving rearward through sliding resistance against the sliding portion. With this configuration, the contact between the sliding portion of the weight and the slope of the restricting portion easily restricts the weight from moving rearward.

In a thirteenth aspect of the claimed invention, the lure according to the twelfth aspect may be configured as follows: The support is an axial member with a shaft-like shape. The sliding portion includes a main body and a hole in the main body through which the axial member is inserted. The hole has an inner diameter greater than the outer diameter of the axial member. With this configuration, the greater inner diameter of the hole relative to the outer diameter of the axial member facilitates the movement of the sliding portion in the transverse direction.

In a fourteenth aspect of the claimed invention, the lure according to the twelfth or thirteenth aspect may further include an urging member. The urging member urges the weight at least forward. This configuration facilitates returning of the weight toward the head.

According to the claimed invention, the center of gravity of the lure can be adjusted appropriately. In addition, according to the claimed invention, the center of gravity of the lure can remain stable while the lure is moving through the water.

BRIEF DESCRIPTION OF THE DRAWINGS

FIG. 8 is a side view illustrating the internal structure of a lure when a weight is engaged with a restricting portion.

DESCRIPTION OF EMBODIMENTS

First Embodiment

Figure 1:
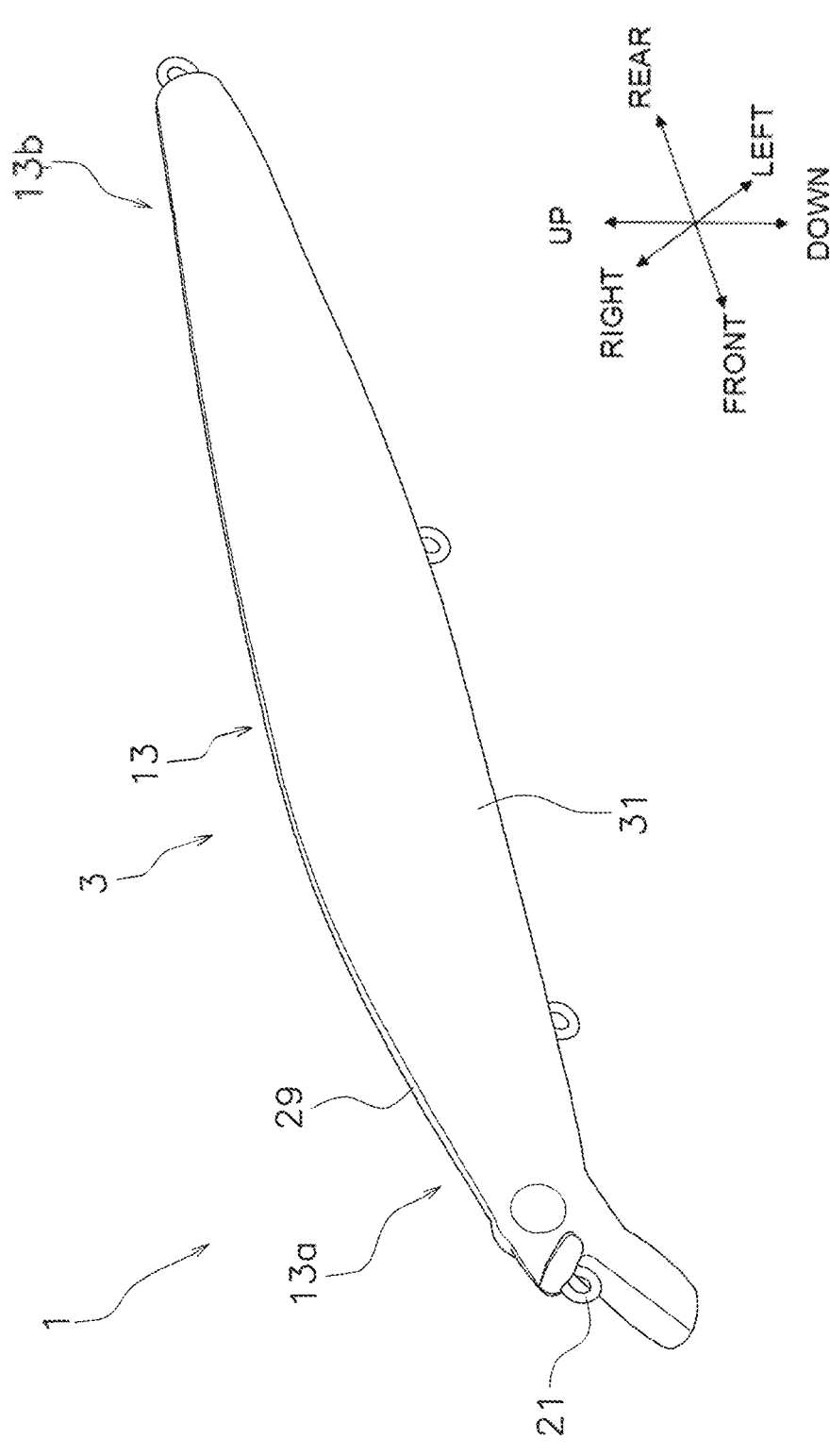
FIG. 1 is an external perspective view of a lure according to a first embodiment of the claimed invention.

In the first embodiment, the lure according to the claimed invention will be described with reference to a lure 1 in FIG. 1. As illustrated in FIG. 2, the lure 1 includes a body 3, a support 5, a weight 7, and an urging member 11.

(Body)

Figure 2:
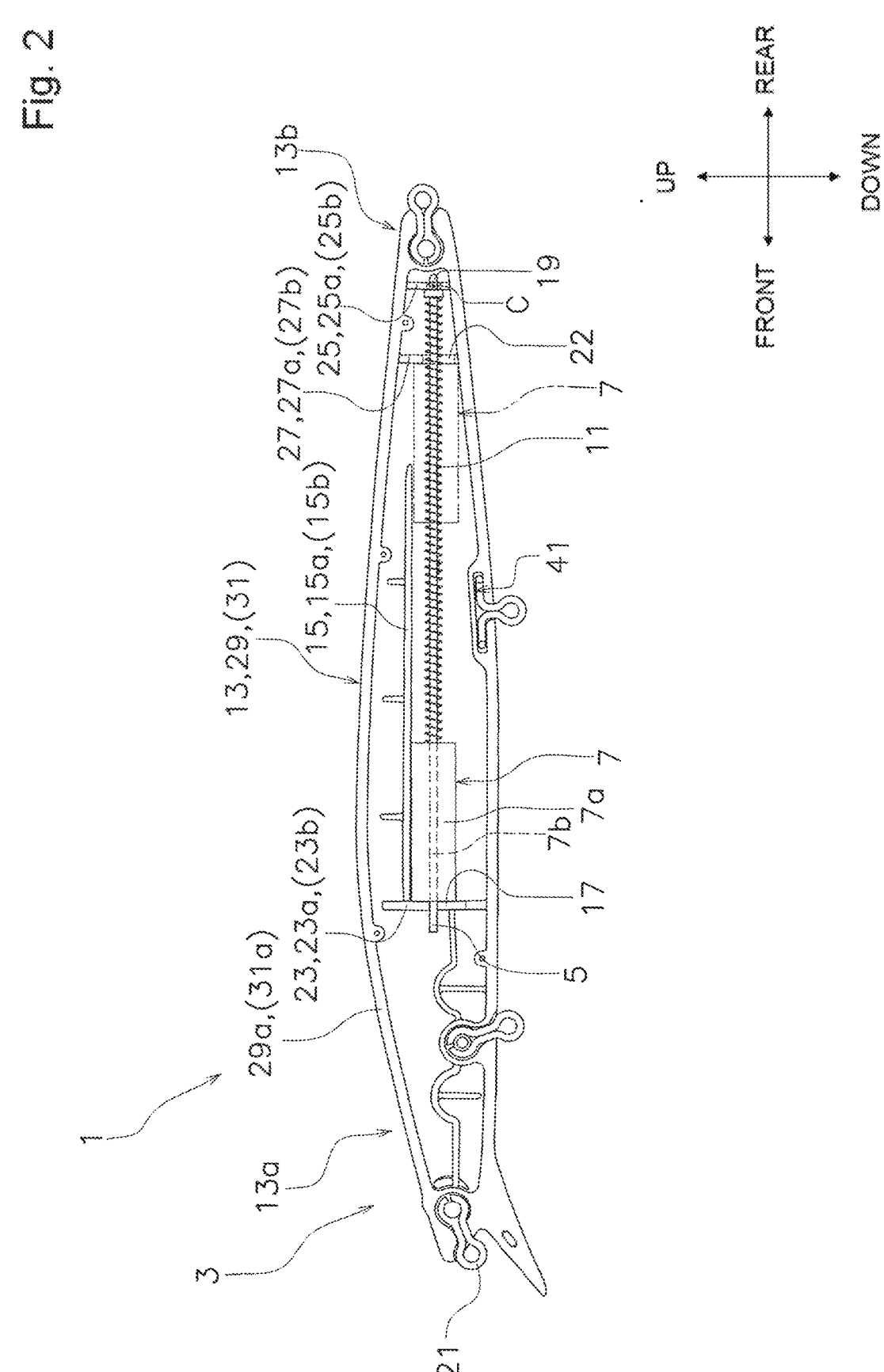
FIG. 2 is a side view illustrating the internal structure of a lure when a weight is located at the upper portion.
Figure 3:
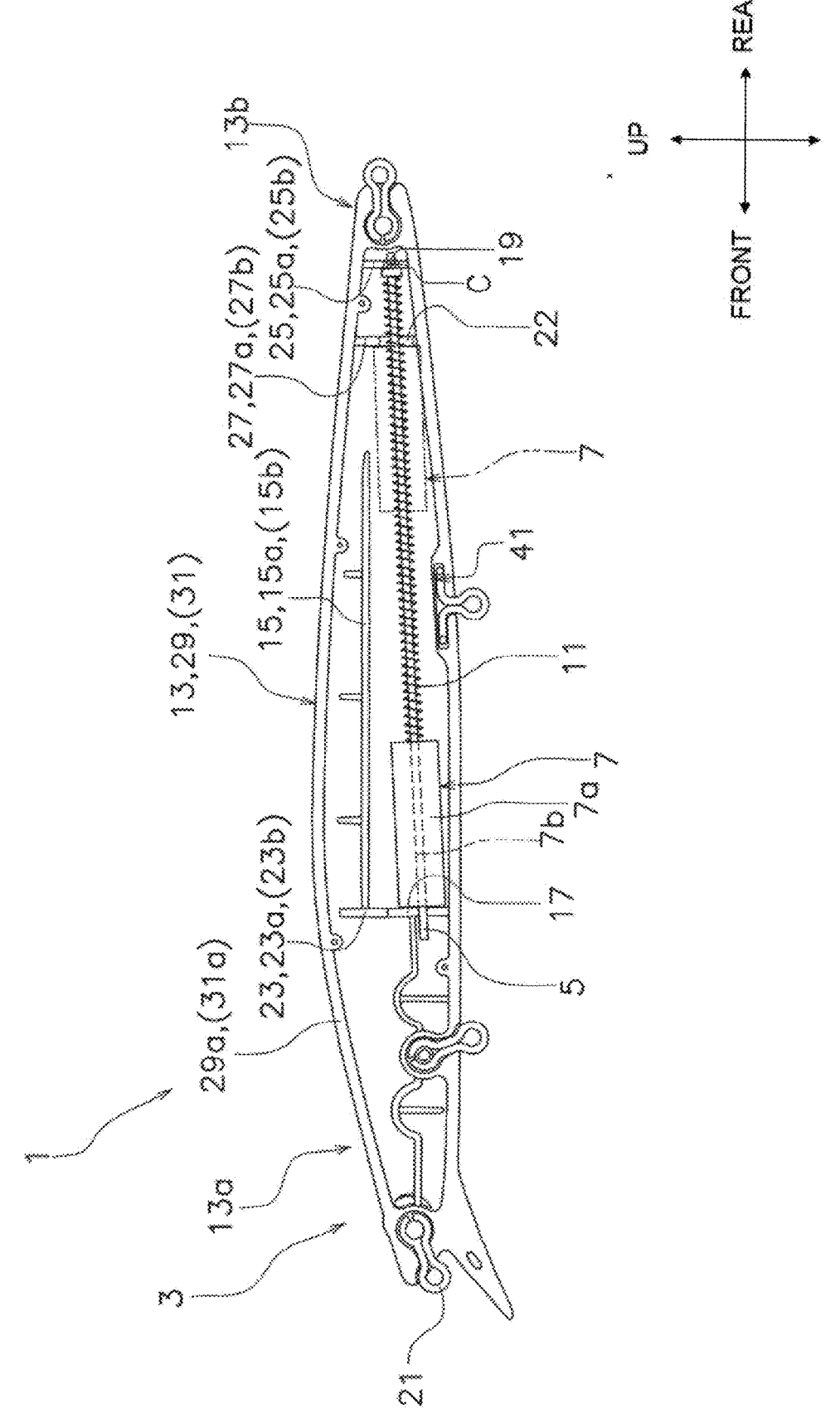
FIG. 3 is a side view illustrating the internal structure of a lure when the weight is located at the lower portion.

As illustrated in FIGS. 2 and 3, the body 3 includes a main body 13, a first slot 17, a support hole 19 (see FIG. 3), and a second slot 22. The main body 13 includes a head 13a in a front portion and a tail 13b in a rear portion.

As illustrated in FIG. 1, the main body 13 has a streamlined outer shape that is elongated from the front to the rear. In the lure 1, where a fishing line (not shown) is connected to a line eye 21, the direction in which the lure 1 moves when pulled by the fishing line is referred to as "front" and "forward."

The direction toward the water surface when the lure 1 moves forward in the water is referred to as "upward". The direction toward the water bottom is referred to as "downward". The left-right direction is perpendicular to the front-rear direction and the up-down direction. A transverse direction intersects the front-rear direction. In this embodiment, the up-down direction may also be referred to as the transverse direction.

As illustrated in FIG. 1, the main body 13 includes a first main body 29 and a second main body 31. The first main body 29 and the second main body 31 are defined by dividing the main body 13 along a plane defined in the front-rear and the up-down directions.

As illustrated in FIGS. 2 and 3, the first main body 29 includes a first joint surface 29a. The first joint surface 29a extends in the front-rear direction. A first front-wall 23a is positioned on the inner surface at the head 13a side of the first main body 29. The first front-wall 23a extends in the up-down direction. A first rear-wall 25a is positioned on the inner lateral surface at the tail 13b side of the first main body 29. The first rear-wall 25a extends in the up-down direction.

A first positioning wall 27a is positioned on the inner lateral surface at the tail 13b side of the first body 29. The first positioning wall 27a is arranged between the first front-wall 23a and the first rear-wall 25a in the front-rear direction. The first positioning wall 27a extends in the up-down direction. A first upper-rib 15a is positioned on the inner lateral surface of the first body 29. The first upper-rib 15a extends in the front-rear direction above a hook-eye storage 41.

A first lower-rib 16a is positioned on the inner surface of the first body 29. The first lower-rib 16a is arranged between the first upper-rib 15a and the hook-eye storage 41 in the up-down direction. The first lower-rib 16a extends in the front-rear direction above the hook-eye storage 41.

As illustrated in FIG. 1, the second main body 31 is positioned opposite the first body 29. The second main body 31 is configured as a mirror image of the first body 29. In other words, the structure of the second main body 31 is substantially identical to that of the first body 29. For this reason, elements of the second main body 31 corresponding to those of the first main body 29 are denoted with the symbol "b." In each figure, these symbols are written in parentheses for the elements of the second main body 31.

For example, the second main body 31 includes a second front-wall 23b, a second rear-wall 25b, and a second alignment-wall 27b. The first front-wall 23a and the second front-wall 23b form the front wall 23. The first rear-wall 25a and the second rear-wall 25b form the rear wall 25. The first alignment-wall 27a and the second alignment-wall 27b form the alignment portion 27. The first upper-rib 15a and the second upper-rib 15b form the upper rib 15.

As illustrated in FIGS. 2 and 3, the first joint surface 29a of the first main body 29 and the joint surface 29b of the second main body 31 are joined, so that an internal space is formed between the first main body 29 and the second main body 31. A first slot 17 is formed between the first front-wall 23a and the second front-wall 23b.

The first slot 17 is situated inside the main body 13 on the head 13a side. The support 5 is inserted through the first slot 17. The first slot 17 guides the front end of the support 5 in the transverse direction. Specifically, the first slot 17 guides the front end of the support 5 in the up-down direction. The length of the first slot 17 in the up-down direction determines the oscillation range of the support 5.

A support hole 19 is formed between the first rear-wall 25a and the second rear-wall 25b. The rear end of the support 5 is inserted into the support hole 19. The support hole 19 holds the rear end of the support 5, enabling it to oscillate. In this embodiment, the position of the support hole 19 determines the oscillation center (C).

As illustrated in FIGS. 2 and 3, a second slot 22 is formed between the first alignment-wall 27a and the second alignment-wall 27b. The second slot 22 is situated inside the main body 13 on the tail 13b side. The rear portion of the support 5 and the rear portion of the urging member 11 are inserted through the second slot 22. The second slot 22 guides the rear portion of the support 5 and the rear portion of the urging member 11 in the transverse direction. Specifically, the second slot 22 guides the rear end of the support 5 and the rear portion of the urging member 11 in the up-down direction.

The alignment portion 27 is positioned inside the main body 13 on the tail 13b side. When the first main body 29 and the second main body 31 are joined, the alignment portion 27 is formed by the first alignment-wall 27a of the first main body 29 and the second alignment-wall 27b of the second main body 31. When the weight 7 moves rearward, the rear portion of the weight 7 abuts against the alignment portion 27, which causes the weight 7 to be aligned on the tail 13b side.

(Support)

As illustrated in FIGS. 2 and 3, the support 5 supports the weight 7. The support 5 extends in the front-rear direction inside the main body 13. The support 5 is arranged inside the main body 13. Specifically, the support 5 is an axial member with a shaft-like shape.

Figure 4:
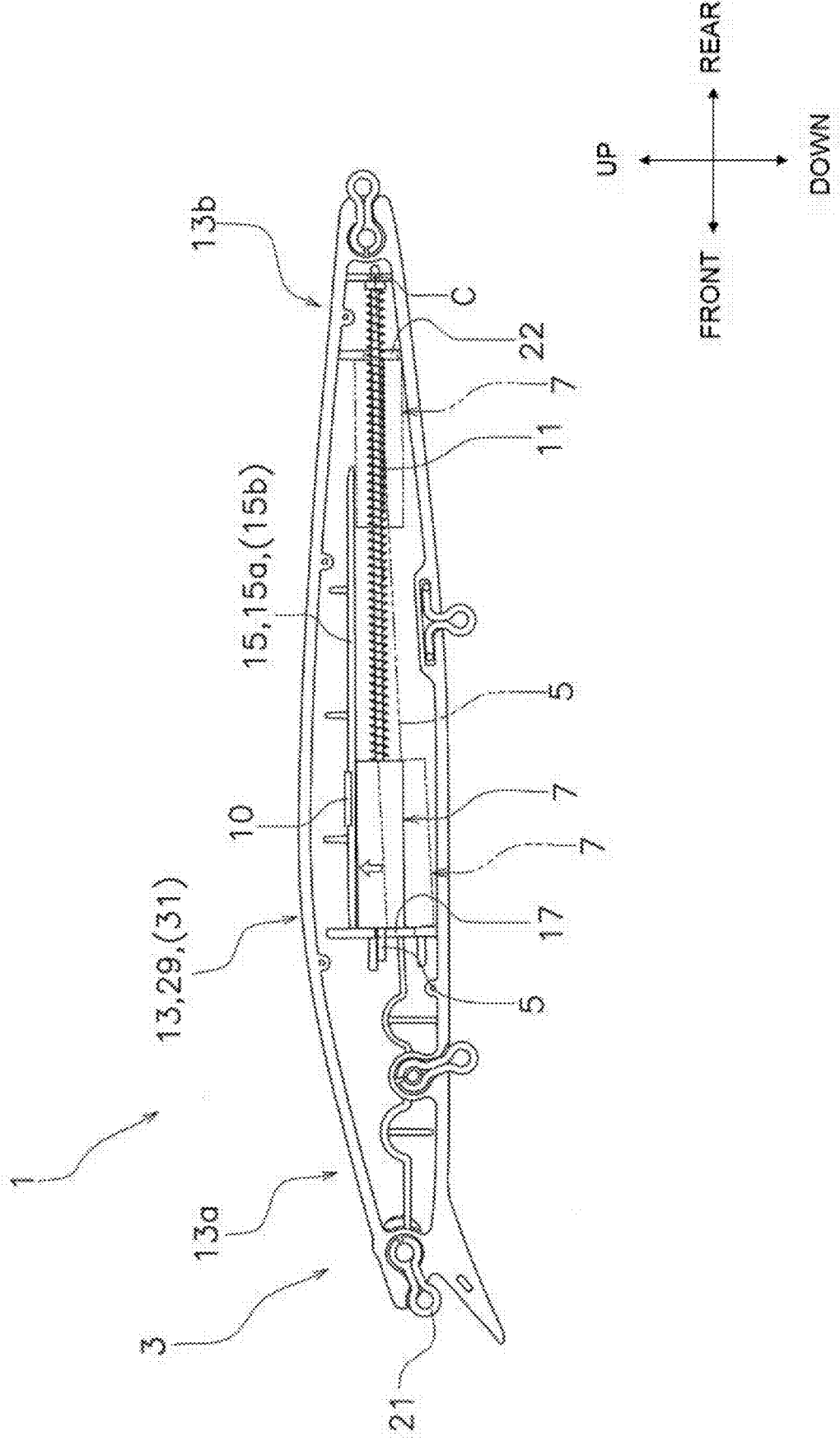
FIG. 4 is a side view illustrating a modification of the first embodiment.

As illustrated in FIGS. 3 and 4, the support 5 is supported by the main body 13 so as to be movable in the transverse direction. In this embodiment, the support 5 is supported by the main body 13 so that the tail end of the support 5 acts as the oscillation center C in the state where the support 5 supports the weight 7.

Specifically, the front end of the support 5 is inserted through the first slot 17. The rear portion of the support 5 is inserted through the second slot 22. The rear end of the support 5 is inserted into the support hole 19 to engage with either the first rear-wall 25a or the second rear-wall 25b.

The front end of the support 5 and the rear portion of the support 5 move in the up-down direction within the first slot 17 and the second slot 22, respectively, in response to the position of the weight 7. The rear end of the support 5 is supported by the support hole 19 so as to oscillate around the position C of the support hole 19. Consequently, the support 5 oscillates around the rear end of the support 5 as the oscillation center C.

(Weight)

As illustrated in FIGS. 2 and 3, the weight 7 is supported by the support 5 inside the main body 13. As illustrated in FIG. 3, the weight 7 is supported by the support 5 so as to be movable in the front-rear direction.

The weight 7 includes a weight body 7a and a hole 7b. The hole 7b is formed through the weight body 7a. The hole 7b penetrates the weight body 7a in the front-rear direction. The support 5 is inserted through the hole 7b. With this configuration, the weight body 7a moves along the support 5 in the front-rear direction as illustrated in FIG. 2.

The weight 7 moves in the front-rear direction between a first position on the head 13a side (indicated by a solid line in FIG. 2) and a second position on the tail 13b side (indicated by a two-dot dashed line in FIG. 2). The first position on the head 13a side is where the front portion of the weight 7 most approaches the front wall 23. In this embodiment, the first position on the head 13a side is specifically where the front portion of the weight 7 abuts against the front wall 23.

The second position on the tail 13b side is where the rear portion of the weight 7 most approaches the alignment portion 27. In this embodiment, the second position on the tail 13b side is specifically where the rear portion of the weight 7 abuts against the alignment portion 27.

As illustrated in FIGS. 2 and 3, the weight 7 is supported by the support 5 so as to be movable in the up-down direction. Specifically, when the support 5 oscillates around the oscillation center C, the weight 7 moves in the up-down direction while being supported by the support 5. In this state, the weight 7 moves along the support 5 in the front-rear direction.

(Urging Member)

The urging member 11 urges the weight 7 at least forward. In this embodiment, as illustrated in FIGS. 2 and 3, the urging member 11 is a coil spring. The urging member 11 is arranged between the weight 7 and the rear wall 25. When the weight 7 is positioned at the first position on the head 13a side, the urging member 11 is compressed.

In the lure 1 with the above configuration, as illustrated in FIG. 2, the weight 7, while being supported by the support 5, moves along the support 5 in the front-rear direction between the front and rear portions of the body 3. Specifically, the weight 7 moves along the support 5 in the front-rear direction between the first position on the head 13a side (indicated by the solid line in FIG. 2) and the second position on the tail 13b side (indicated by the two-dot dashed line in FIG. 2).

When a downward force is applied to the weight 7 in the state where the weight 7 is positioned at the solid-line position in FIG. 2 (the first position on the head 13a side), the support 5 oscillates downward as illustrated in FIG. 3, and the weight 7 moves downward.

When the weight 7 is positioned at the solid-line position in FIG. 3 (the first position on the head 13a side), the weight 7 moves along the support 5 in the front-rear direction. In this state, when an upward force is applied to the weight 7, the support 5 oscillates upward, and the weight 7 moves upward. As a result, the weight 7 returns to the solid-line position in FIG. 2 (the first position on the head 13a side).

When the weight 7 is positioned between the first position on the head 13a side and the second position on the tail 13b side in the front-rear direction, and a force is applied to the weight 7 in the upward or downward direction, the support 5 oscillates upward or downward. That is, the weight 7 moves upward or downward at a position between the first position on the head 13a side and the second position on the tail 13b side.

In the lure 1, the support 5 is movable in the transverse direction, and the weight 7 is supported by the support 5 so as to be movable in the front-rear direction. Therefore, when the support 5 moves in the transverse direction, the weight 7 also moves in the transverse direction together with the support 5. This configuration enhances the degree of freedom in the movement path of the weight 7 in the lure 1 compared to the prior art. That is, in the lure 1, the center of gravity position can be adjusted suitably. Additionally, the weight 7 moves not only in the forward and backward directions but also in the transverse direction in response to the action (e.g., winding operation) imparted to the lure 1 by the angler. This results in more irregular behavior of the lure 1.

In the lure 1, the weight 7 supported by the support 5 can oscillate, thereby enhancing the degree of freedom of the movement path of the weight 7. In the lure 1, the front end of the support 5 with a shaft-like shape is guided in the transverse direction by the first slot 17 of the body 3. Therefore, the weight 7 supported by the support 5 can move stably in the transverse direction. Furthermore, in the lure 1, the weight 7 can easily return to the head 13a side.

Modifications of First Embodiment

One embodiment of the claimed invention has been described above. However, the claimed invention is not limited to this first embodiment, and various modifications are possible without departing from the scope of the claimed invention.

In the configuration of the first embodiment, the lure 1 may further include a magnet 10, as illustrated in FIG. 4. In this case, the weight 7 is at least partially comprised of magnetic material. In the first embodiment, the weight 7 is comprised of magnetic material. With this configuration, the weight 7 is attracted to the magnet 10.

The magnet 10 is positioned on the main body 13 to hold the weight 7 in the first position on the head 13a side. In the first embodiment, the magnet 10 is located on the upper rib 15. With this configuration, when the weight 7 is placed at the position indicated by the solid line in FIG. 4, corresponding to the first position on the head 13a side, the weight 7 is held by the magnet 10. In this state, when the backward force applied to the weight 7 exceeds the magnetic attraction of the magnet 1 for the weight 7, the weight 7 moves backward along the support 5.

When the weight 7 is positioned at the first position on the head 13a side as illustrated by the solid line in FIG. 4, and the downward force applied to the weight 7 exceeds the magnetic attraction of the magnet 1 for the weight 7, the support 5 oscillates downward and the weight 7 moves downward.

Second Embodiment

The lure according to a second embodiment of the claimed invention will be described using the lure 1 illustrated in FIG. 5. As illustrated in FIG. 6, the lure 1 includes a body 3, a support 5, a weight 7, a restricting portion 9, and an urging member 11. FIG. 6 is a perspective view of the weight 7 engaged with the restricting portion 9.

(Body)

Figure 6:
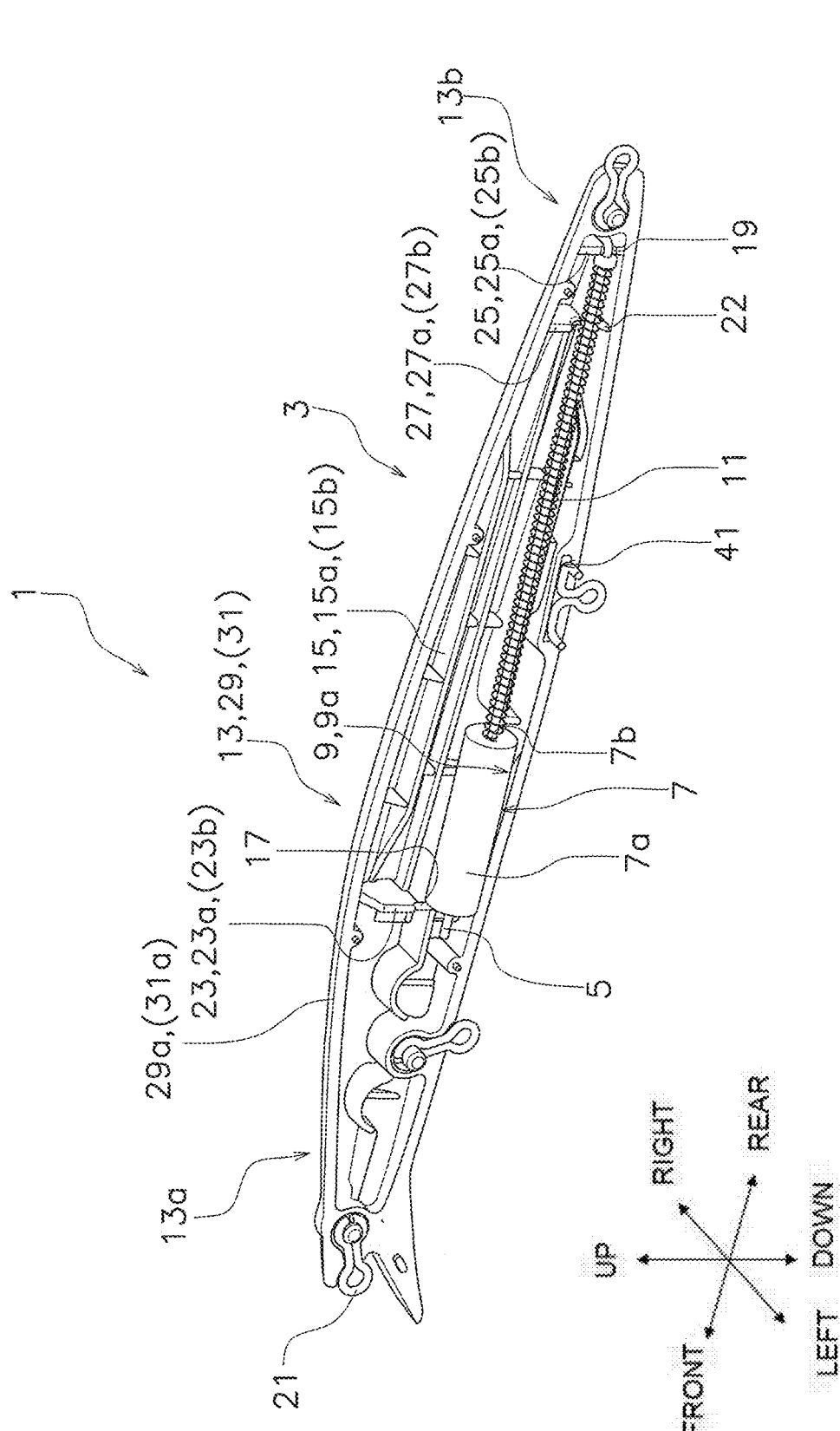
FIG. 6 is a perspective view illustrating the internal structure of a lure.
Figure 7:
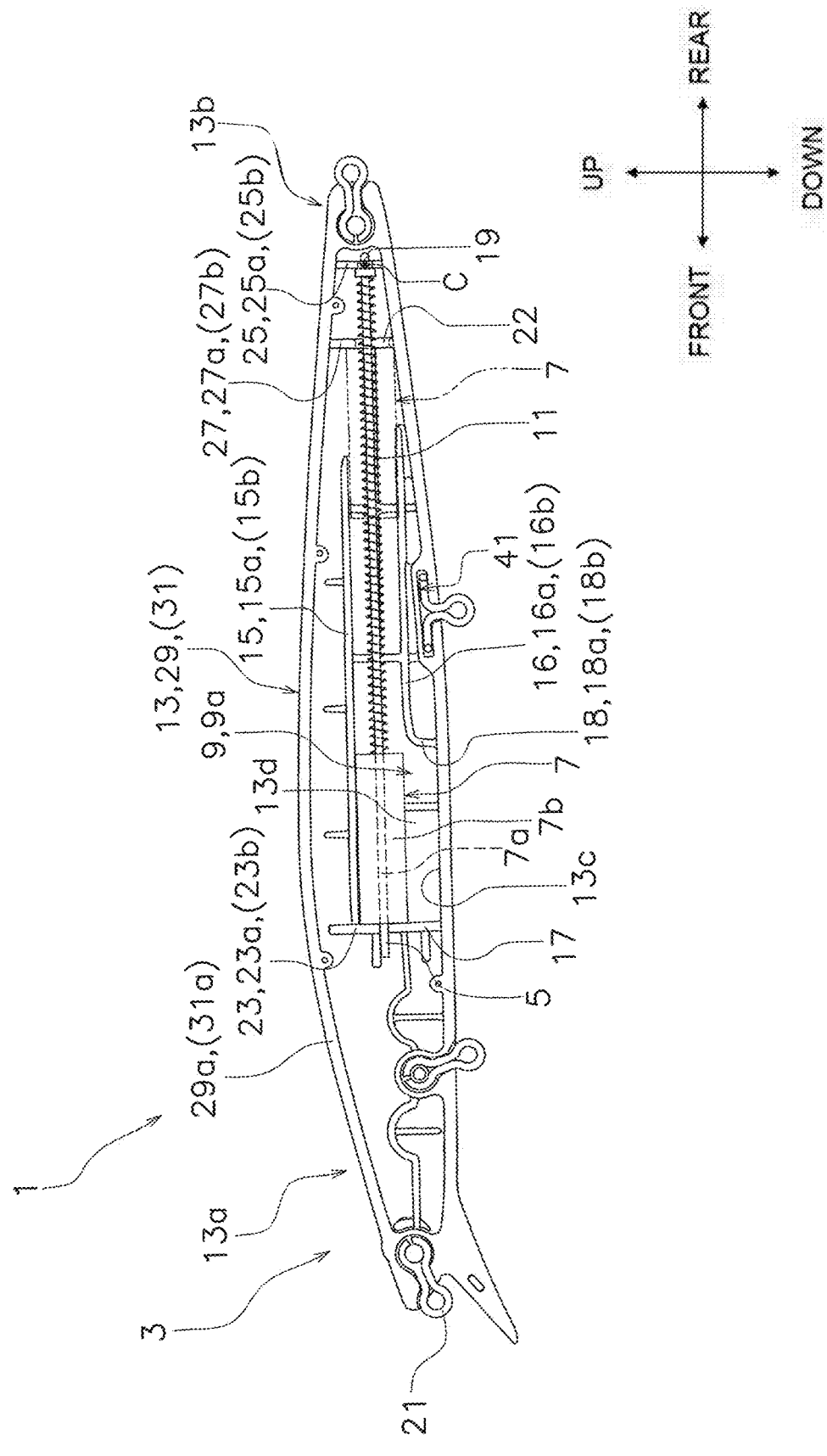
FIG. 7 is a side view illustrating the internal structure of a lure when a weight is disengaged from a restricting portion.

As illustrated in FIGS. 6 and 7, the body 3 includes a main body 13, a first slot 17, a support hole 19 (see FIG. 7), and a second slot 22. The main body 13 includes a head 13a in a front portion and a tail 13b in a rear portion.

As illustrated in FIG. 1, the main body 13 has a streamlined outer shape that is elongated from the front to the rear. In lure 1, where a fishing line (not shown) is connected to a line eye 21, the direction in which lure 1 advances as it is pulled by the fishing line is determined as "front" and "forward".

The direction toward the water surface when the lure 1 moves forward in the water is referred to as "upward". The direction toward the water bottom is referred to as "downward". The left-right direction is perpendicular to the front-rear direction and the up-down direction. A transverse direction intersects the front-rear direction. In this embodiment, the up-down direction may also be referred to as the transverse direction.

Figure 5:
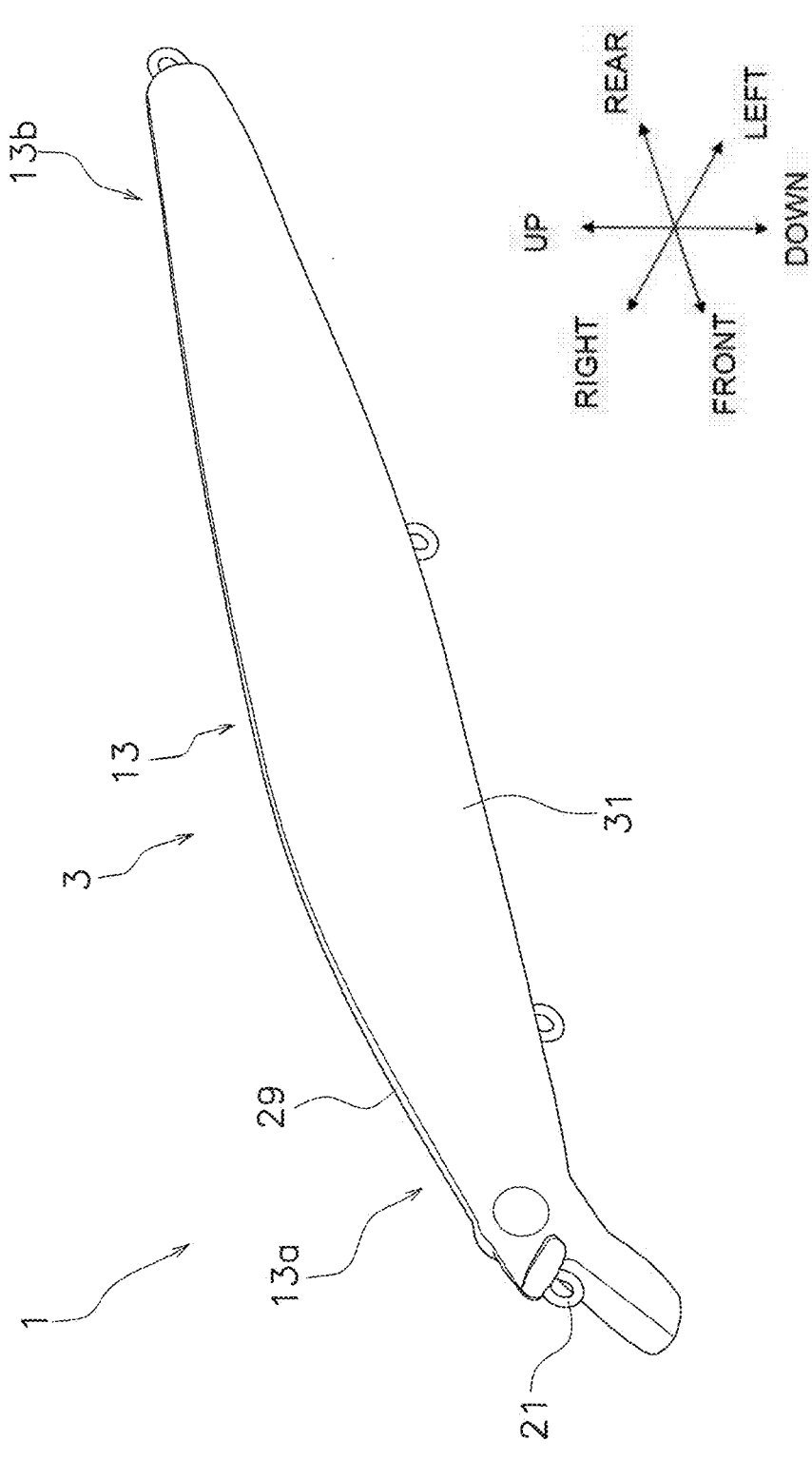
FIG. 5 is an external perspective view of a lure according to a second embodiment of the claimed invention.

As illustrated in FIG. 5, the main body 13 includes a first main body 29 and a second main body 31. The first main body 29 and the second main body 31 are defined by dividing the main body 13 along a plane defined in the front-rear and the up-down directions.

As illustrated in FIGS. 6 and 7, the first main body 29 includes a first joint surface 29a. The first joint surface 29a extends in the front-rear direction. A first front-wall 23a is positioned on the inner lateral surface of the first main body 29 on the head 13a side. The first front-wall 23a extends in the up-down direction. A first rear-wall 25a is positioned on the inner lateral surface of the first main body 29 on the tail 13b side. The first rear-wall 25a extends in the up-down direction.

A first alignment-wall 27a is positioned on the inner lateral surface of the first main body 29 on the tail 13b side. The first alignment-wall 27a is arranged between the first front-wall 23a and the first rear-wall 25a in the front-rear direction. The first alignment-wall 27a extends in the up-down direction.

A first upper-rib 15a is positioned on the inner surface of the first main body 29. The first upper-rib 15a extends in the front-rear direction above the hook-eye storage 41.

A first lower-rib 16a is positioned on the inner surface of the first main body 29. The first lower-rib 16a is situated between the first upper-rib 15a and the hook-eye storage 41 in the up-down direction. The first lower-rib 16a extends in the front-rear direction above the hook-eye storage 41.

A first front-rib 18a is positioned on the inner surface of the first main body 29. The first front-rib 18a is arranged in front of the hook-eye storage 41. The first front-rib 18a extends downward from the front of the first lower-rib 16a.

As illustrated in FIG. 5, the second main body 31 is positioned opposite the first main body 29. The second main body 31 is configured as a mirror image of the first main body 29. In other words, the structure of the second main body 31 is substantially identical to that of the first main body 29. For this reason, elements of the second main body 31 corresponding to those of the first main body 29 are denoted with the symbol "b." In each figure, these symbols are written in parentheses for the elements of the second main body 31.

For example, the second main body 31 includes a second front-wall 23b, a second rear-wall 25b, a second alignment-wall 27b, a second upper-rib 15b, a second lower-rib 16b, and a second front-rib 18b. The first front-wall 23a and the second front-wall 23b form the front wall 23. The first rear-wall 25a and the second rear-wall 25b form the rear wall 25. The first alignment-wall 27a and the second alignment-wall 27b form the alignment portion 27.

The first upper-rib 15a and the second upper-rib 15b form the upper rib 15. The first lower-rib 16a and the second lower-rib 16b form the lower rib 16. The first front-rib 18a and the second front-rib 18b form the front rib 18.

As illustrated in FIGS. 6 and 7, the first joint surface 29a of the first main body 29 and the joint surface 29b of the second main body 31 are joined, so that an internal space is formed between the first main body 29 and the second main body 31. A first slot 17 is formed between the first front-wall 23a and the second front-wall 23b.

The first slot 17 is positioned inside the main body 13 on the head 13a side. The support 5 is inserted through the first slot 17. The first slot 17 guides the front end of the support 5 in the transverse direction. Specifically, the first slot 17 guides the front end of the support 5 in the up-down direction. The length of the first slot 17 in the up-down direction determines the oscillation range of the support 5.

A support hole 19 is formed between the first rear-wall 25a and the second rear-wall 25b. The rear end of the support 5 is inserted into the support hole 19. The support hole 19 supports the rear end of the support 5, enabling it to oscillate. In this embodiment, the position of the support hole 19 determines the oscillation center (C).

As illustrated in FIGS. 6 and 7, a second slot 22 is formed between the first alignment-wall 27a and the second alignment-wall 27b. The second slot 22 is positioned inside the main body 13 on the tail 13b side. The rear portion of the support 5 and the rear portion of the urging member 11 are inserted through the second slot 22. The second slot 22 guides the rear portion of the support 5 in the transverse direction. Specifically, the second slot 22 guides the rear end of the support 5 in the up-down direction.

The alignment portion 27 is positioned inside the main body 13 on the tail 13b side. When the first main body 29 and the second main body 31 are joined, the alignment portion 27 is formed by the first alignment-wall 27a of the first main body 29 and the second alignment-wall 27b of the second main body 31. When the weight 7 moves rearward, the rear portion of the weight 7 abuts against the alignment portion 27, which causes the weight 7 to be aligned on the tail 13b side.

As illustrated in FIGS. 6 and 7, the upper rib 15 is positioned above the weight 7. When the first main body 29 and the second main body 31 are joined, the upper rib 15 is formed above the lower rib 16. The lower rib 16 is situated below the support 5 and the urging member 11. A space is created between the upper rib 15 and the lower rib 16 to allow the weight 7 to pass between the upper rib 15 and the lower rib 16. The front rib 18 extends downward from the front portion of the lower rib 16, in front of the hook-eye storage 41.

(Support)

As illustrated in FIGS. 6 and 7, the support 5 supports the weight 7. The support 5 extends in the front-rear direction inside the main body 13. The support 5 is disposed inside the main body 13. Specifically, the support 5 is an axial member with a shaft-like shape.

Figure 8:
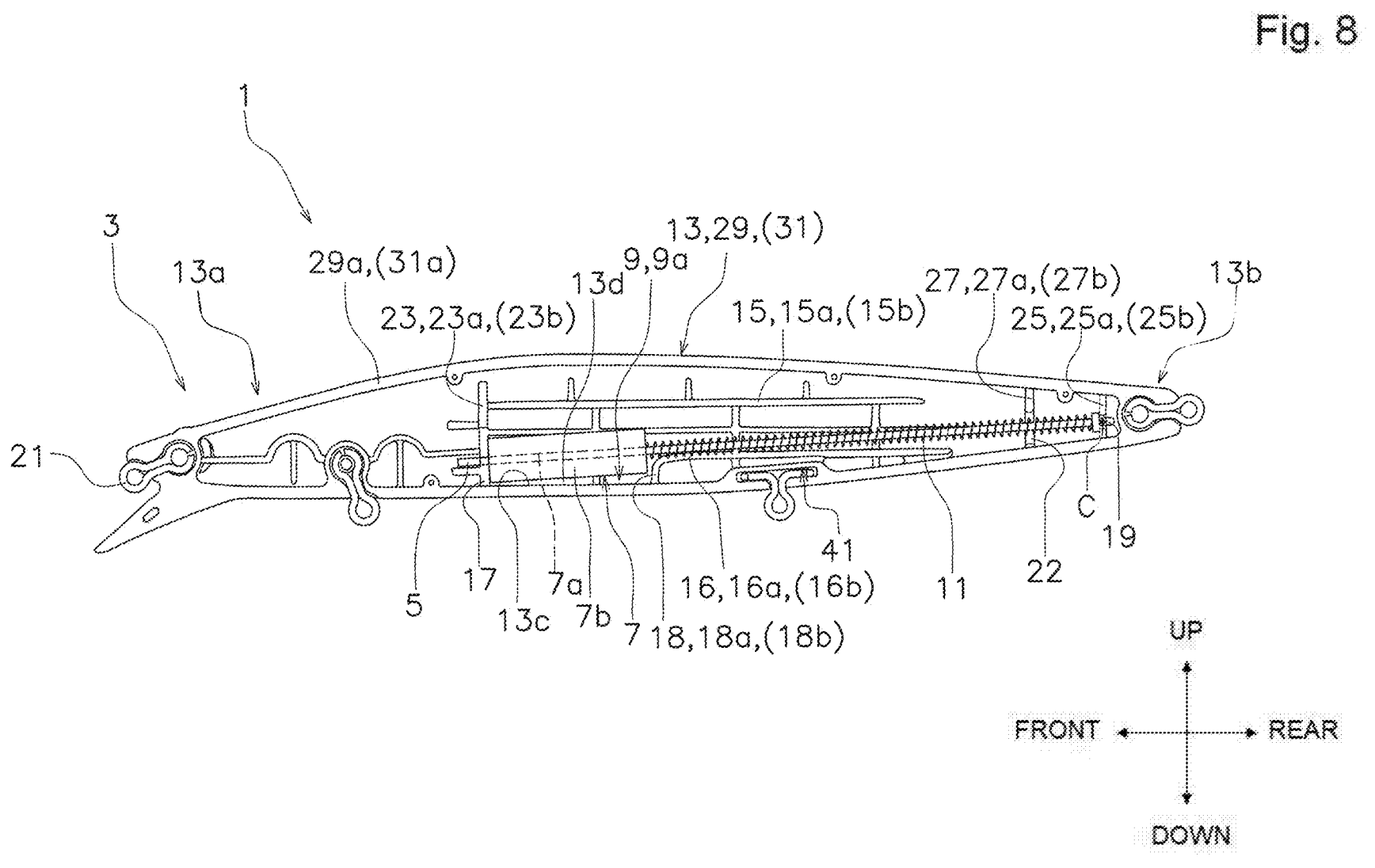

As illustrated in FIGS. 7 and 8, the support 5 is supported by the main body 13 so as to be movable in the transverse direction. In this embodiment, the support 5 is supported by the main body 13 so that the tail end of the support 5 acts as the oscillation center C in the state where the support 5 supports the weight 7.

Specifically, the front end of the support 5 is inserted through the first slot 17. The rear portion of the support 5 is inserted through the second slot 22. The rear end of the support 5 is inserted into the support hole 19 to engage with either the first rear-wall 25a or the second rear-wall 25b.

The front end of the support 5 and the rear portion of the support 5 move in the up-down direction within the first slot 17 and the second slot 22, respectively, in response to the position of the weight 7. The rear end of the support 5 is supported by the support hole 19 so as to oscillate around the position C of the support hole 19. Consequently, the support 5 oscillates around the rear end of the support 5 as the oscillation center C.

(Weight)

As illustrated in FIGS. 6 and 7, the weight 7 is supported by the support 5 inside the main body 13. As illustrated in FIG. 7, the weight 7 is supported by the support 5 so as to be movable in the front-rear direction. As illustrated in FIGS. 7 and 8, the weight 7 is supported by the support 5 so as to be movable in the up-down direction. As illustrated in FIG. 8, the weight 7 is restricted by the restricting portion 9 as the weight 7 moves downward.

The weight 7 includes a weight body 7a and a hole 7b. The weight body 7a is arranged between the upper rib 15 and the lower inner surface of the main body 13 in the up-down direction. A hole 7b is formed through the weight body 7a. The hole 7b penetrates the weight body 7a in the front-rear direction. The support 5 is inserted through the hole 7b. With this configuration, as illustrated in FIG. 7, the weight body 7a moves along the support 5 in the front-rear direction.

The weight 7 moves in the front-rear direction between a first position on the head 13a side (indicated by a solid line in FIG. 2) and a second position on the tail 13b side (indicated by a two-dot dashed line in FIG. 2). The first position on the head 13a side is where the front portion of the weight 7 most approaches the front wall 23. In this embodiment, the first position on the head 13a side is specifically where the front portion of the weight 7 abuts against the front wall 23.

The second position on the tail 13b side is where the rear portion of the weight 7 most approaches the alignment portion 27. In this embodiment, the second position on the tail 13b side is specifically where the rear portion of the weight 7 abuts against the alignment portion 27.

When a downward force is applied to the weight 7 in a state in which the weight 7 is close to the upper rib 15 at the first position on the head 13a side as illustrated in FIG. 7, the support 5 oscillates downward as illustrated in FIG. 8. This causes the weight 7 to engage with the restricting portion 9. Similarly, when an upward force is applied to the weight 7 in the state illustrated in FIG. 8, the support 5 oscillates upward as illustrated in FIG. 7. This causes the weight 7 to disengage from the restricting portion 9.

(Restricting Portion)

As illustrated in FIGS. 6, 7 and 8, the restricting portion 9 is configured to limit the weight 7 from moving rearward. The restricting portion 9 is positioned on the inner surface of the main body 13 in the front portion of the main body 13. In this embodiment, as illustrated in FIGS. 7 and 8, the restricting portion 9 is a recess 9a formed on the inner surface of the main body 13. The recess 9a is located in the front and lower portion of the main body 13. Specifically, the recess 9a has a concave shape in which the weight 7 can be situated. The recess 9a is formed by the front wall 23, the lower inner surface 13c of the main body 13, the inner lateral surfaces 13d of the main body 13, and the front rib 18.

(Urging Member)

The urging member 11 urges the weight 7 at least forward. In this embodiment, as illustrated in FIGS. 6, 7, and 8, the urging member 11 is a coil spring. The urging member 11 is arranged between the weight 7 and the rear wall 25. When the weight 7 is positioned at the first position on the head 13a side, the urging member 11 is compressed.

In the lure 1 with the above configuration, as illustrated in FIG. 7, the weight 7, while being supported by the support 5, moves along the support 5 in the front-rear direction between the front and rear portions of the body 3. Specifically, the weight 7 moves along the support 5 in the front-rear direction between the first position on the head 13a side (indicated by the solid line in FIG. 7) and the second position on the tail 13b side (indicated by the two-dot dashed line in FIG. 7).

When a downward force is applied to the weight 7 positioned at the first position on the head 13a side, as illustrated in FIG. 7, the weight 7 moves downward, as illustrated in FIG. 8. As a result, as illustrated in FIGS. 6 and 8, the restricting portion 9 restricts the weight 7 from moving rearward. Thus, the restricting portion 9 in the front portion of the body 3 easily limits the rearward movement of the weight 7. In other words, in lure 1, a simple structure stabilizes the center of gravity while the lure is moving through the water.

In lure 1, the weight 7 engages with the recess 9a which functions as the restricting portion 9. As a result, the rearward movement of the weight 7 is reliably restricted. Furthermore, in lure 1, the support 5 has a shaft-like shape and oscillates around the tail side as the oscillation center. This configuration allows the weight 7 to move easily in the up-and-down direction. Additionally, in lure 1, the urging member 11 urges the weight 7 at least forward, enabling the weight 7 to be easily returned to the head 13a side.

Modification of Second Embodiment

One embodiment of the claimed invention has been described above. However, the claimed invention is not limited to the second embodiment, and various modifications are possible within the scope of the invention.

Figure 9:
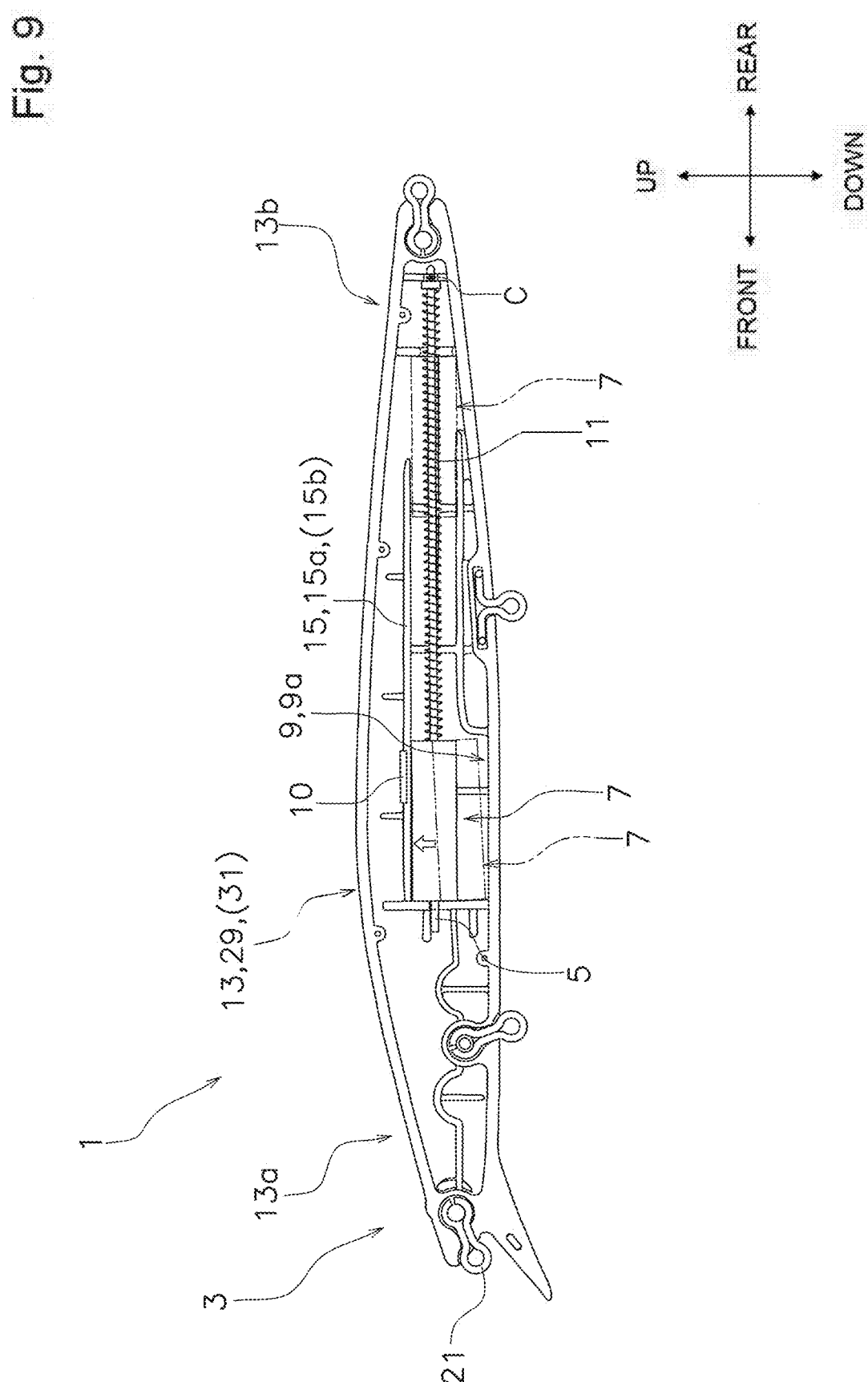
FIG. 9 is a side view illustrating a modification of the first embodiment.

In the configuration of the second embodiment, as illustrated in FIG. 9, the lure 1 may further include a magnet 10. In this case, at least part of the weight 7 is comprised of a magnetic material. In the second embodiment, the weight 7 is comprised of a magnetic material. As a result, the weight 7 is attracted to the magnet 10.

The magnet 10 is positioned on the main body 13 so that the support 5 is arranged between the recess 9a and the magnet 10 in the up-down direction. Specifically, the magnet 10 is positioned on the upper rib 15 of the main body 13 above the recess 9a. In this configuration, when the lure 1 is suspended with its head-side facing upward, the recess 9a remains disengaged due to the magnetic force of the magnet 10. As a result, the weight 7 moves smoothly toward the tail during casting.

Third Embodiment

The configuration of lure 1 in a third embodiment is substantially the same as that of the second embodiment, except for the configurations of the body 3, the restricting portion 9, and the weight 7. In the third embodiment, components identical to those in the second embodiment are denoted by the same reference numerals. Descriptions of components similar to those in the second embodiment are omitted from the third embodiment. Omitted descriptions in the third embodiment are based on the descriptions provided in the second embodiment.

Figure 10:
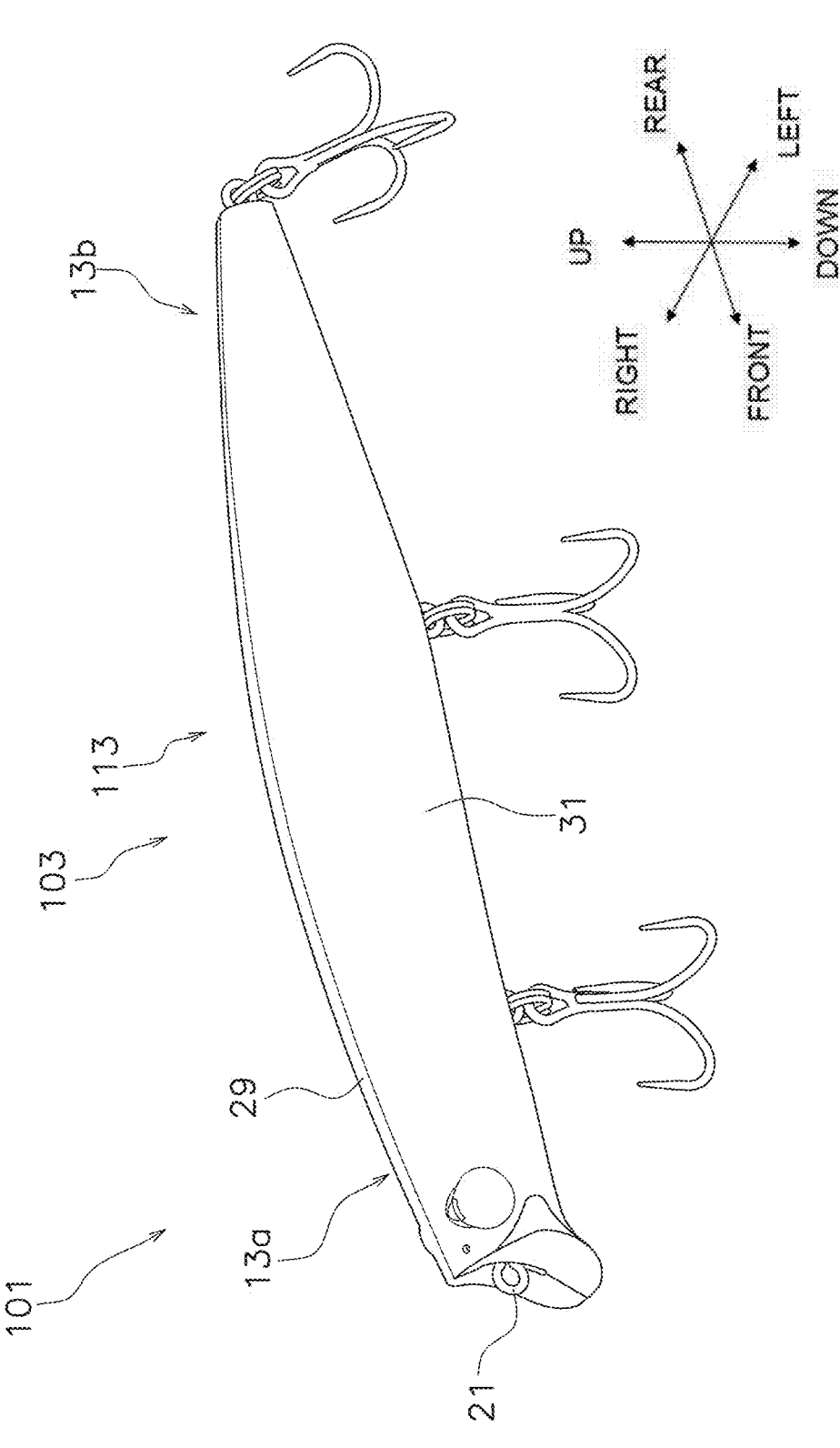
FIG. 10 is an external perspective view of a lure according to a third embodiment of the claimed invention.
Figure 11:
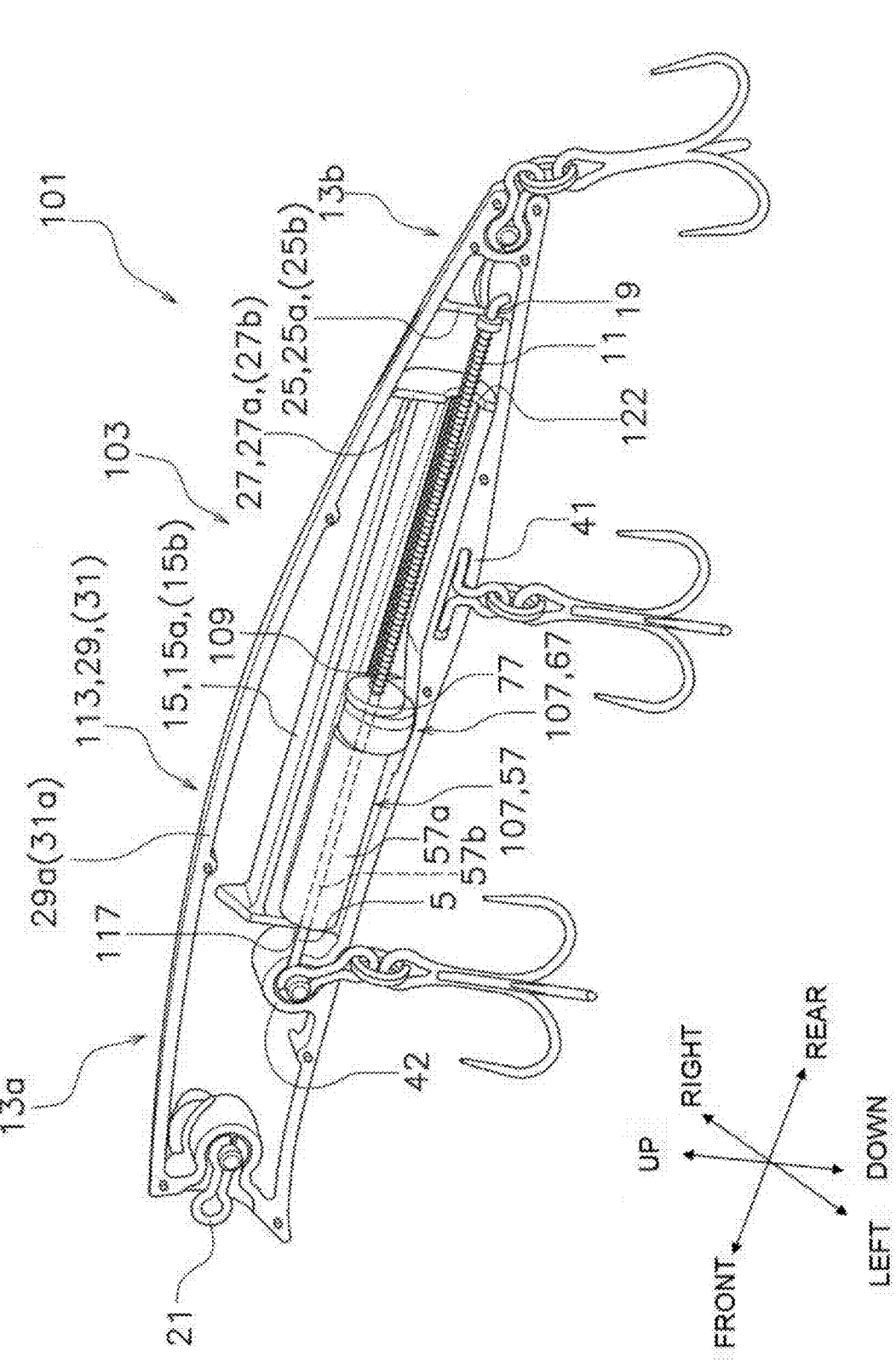
FIG. 11 is a perspective view illustrating the internal structure of a lure.

The lure 101 of the third embodiment is depicted in FIG. 10. As illustrated in FIG. 11, the lure 101 includes a body 103, a support 5, a weight 107, a restricting portion 109, and an urging member 11. The lure 101 illustrated in FIG. 11 is a perspective view where the weight 107 is engaged with the restricting portion 109. The configurations of the support 5 and the urging member 11 are each substantially the same as those in the second embodiment.

(Body)

Figure 12:
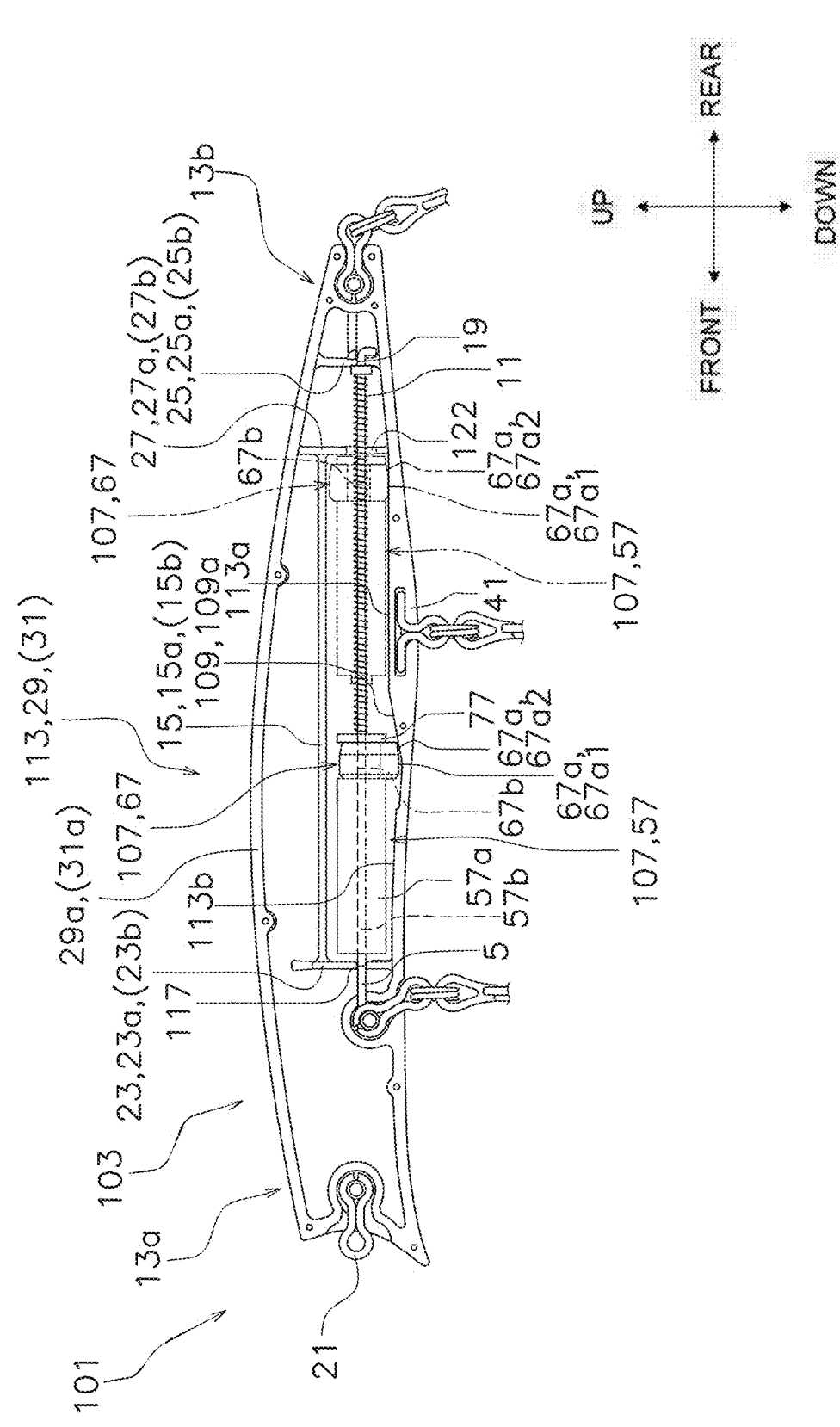
FIG. 12 is a side view illustrating the internal structure of a lure.

As illustrated in FIGS. 11 and 12, the body 103 includes a main body 113, a first support hole 117, a second support hole 19, and an insertion hole 122. The first support hole 117 is located in the main body 113. The first support hole 117 is formed when the first joint surface 29a of the first main body 29 and the joint surface 29b of the second main body 31 are joined, similar to the first slot 17 of the second embodiment. The front portion of the support 5 is inserted into the first support hole 117.

The configuration of the second support hole 19 is the same as in the second embodiment. The front end of the support 5 is fixed to the main body 113, for example, the first hook-eye storage 42 of the main body 113. The rear end of the support 5 is inserted into the support hole 19 and engaged with either the first rear-wall 25a or the second rear-wall 25b. In the third embodiment, the support 5, extending in the front-rear direction, does not oscillate as it does in the second embodiment.

The insertion hole 122 is positioned in the main body 113. The insertion hole 122 is formed when the first joint surface 29a of the first main body 29 and the joint surface 29b of the second main body 31 are joined, similar to the second slot portion 22 of the second embodiment. The rear portion of the support 5 and the rear portion of the urging member 11 are inserted into the insertion hole 122.

(Weight)

As illustrated in FIG. 11, the weight 107 has a weight body 57 and a sliding portion 67. The weight body 57 is arranged between the upper rib 15 and the lower inner surface of the main body 113 in the up-down direction. The weight body 57 includes a first body 57a and a first hole 57b. The first body 57a is arranged between the upper rib 15 and the lower inner surface of the main body 113 in the up-down direction. The first hole 57b is formed through the first body 57a. The first hole 57b penetrates the first body 57a in the front-rear direction. The support 5 is inserted through the first hole 57b. With this configuration, the weight body 57 moves along the support 5 in the front-rear direction.

The sliding portion 67 is arranged between the upper rib 15 and the lower inner surface of the main body 113 in the up-down direction. The sliding portion 67 is positioned adjacent to the weight body 57 in the front-rear direction. The sliding portion 67 is positioned behind the weight body 57. The sliding portion 67 is arranged between the weight body 57 and the urging member 11. Specifically, the front portion of the sliding portion 67 is positioned adjacent to the rear portion of the weight body 57. A washer 77 is placed on the rear portion of the sliding portion 67. The urging member 11 contacts with the washer 77.

Figure 13A:
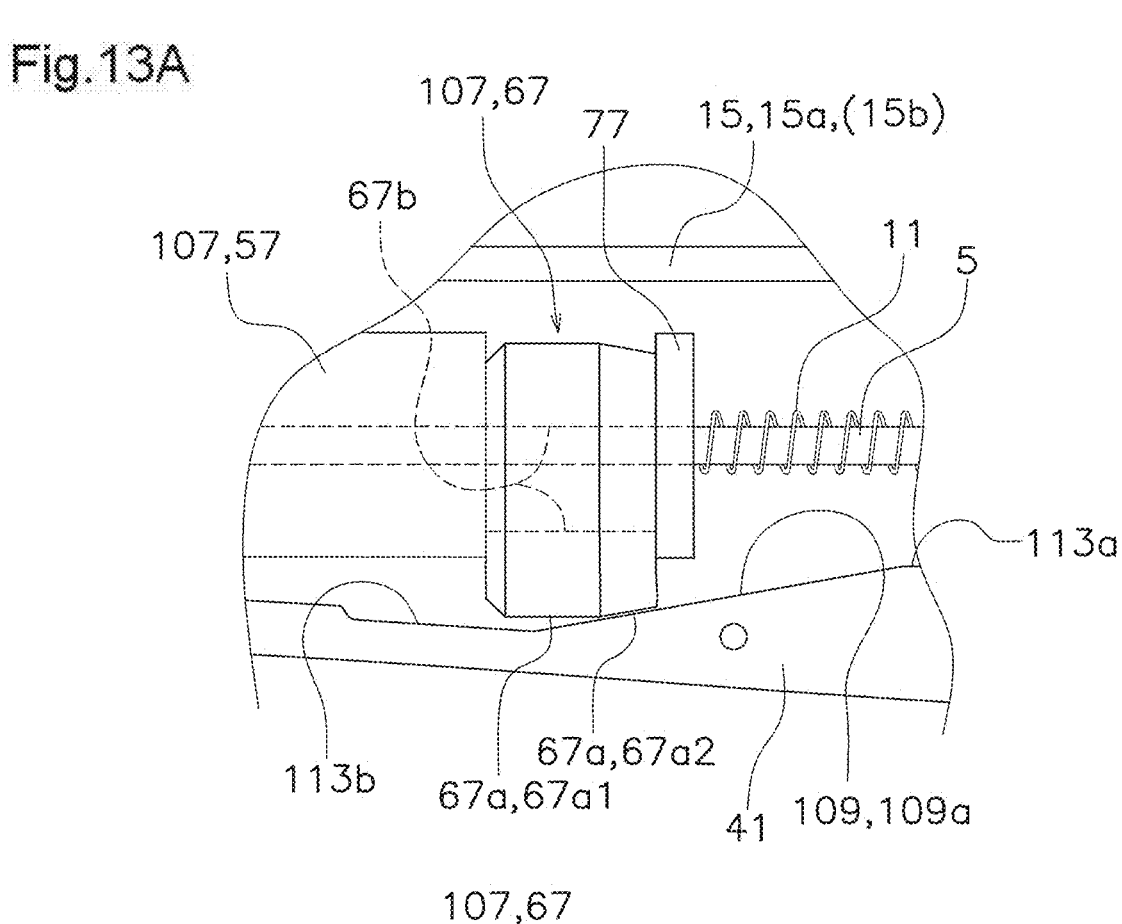
FIG. 13A is a partially-enlarged side view illustrating the positional relationship between a sliding portion and a restricting portion when a weight is positioned on the head side of a lure.
Figure 13B:
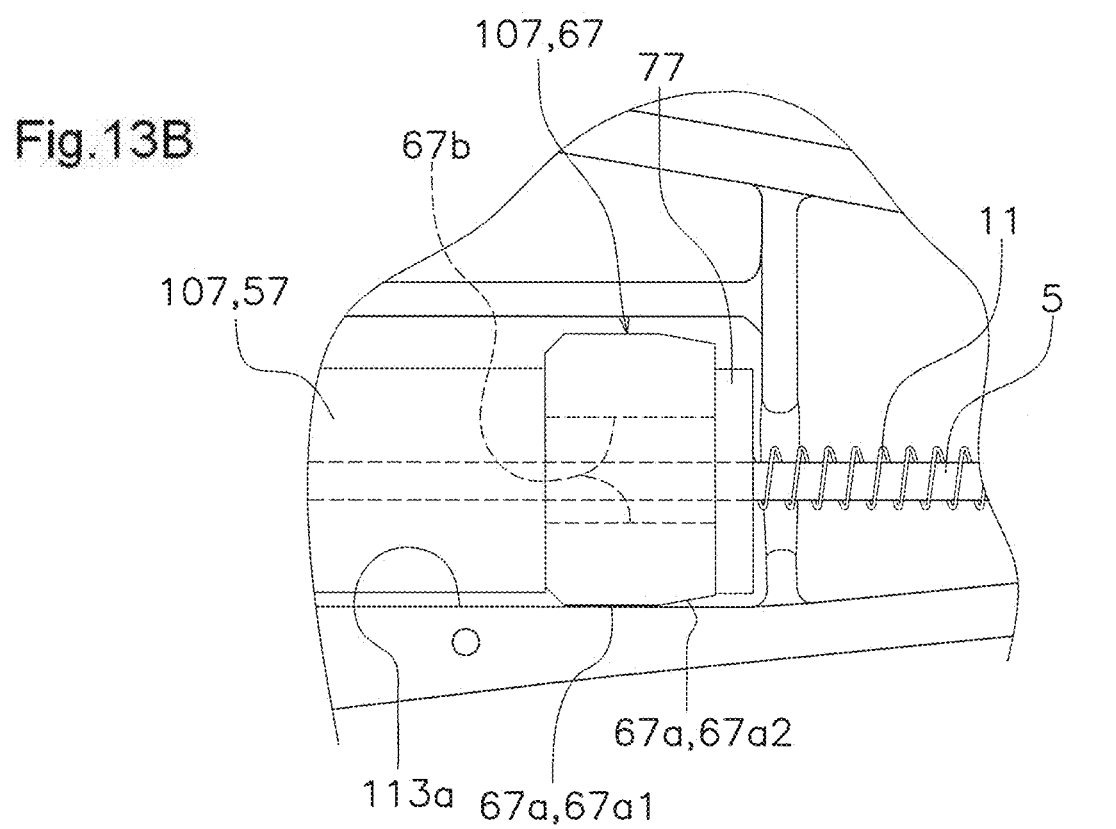
FIG. 13B is a partially-enlarged side view illustrating the positional relationship between a sliding portion and a restricting portion when a weight is positioned on the head side of a lure.

As illustrated in FIGS. 12, 13A, and 13B, the sliding portion 67 is configured to slide with the restricting portion 109. The sliding portion 67 is preferably comprised of synthetic resin with high sliding properties or metal with high sliding properties. The sliding portion 67 includes a second body 67a and a second hole 67b. The second body 67a includes a lower surface 67al and a contact surface 67a2. The lower surface 67al extends in the front-rear direction. The contact surface 67a2 extends upward from the lower surface 67al rearward. The contact surface 67a2 contacts the restricting portion 109.

As illustrated in FIGS. 13A and 13B, the second hole 67b is located in the second body 67a. The second hole 67b penetrates the second body 67a in the front-rear direction. The shaft-shaped support 5 is inserted through the second hole 67b. With this configuration, the weight body 57 and the sliding portion 67 move along the support 5 in the front-rear direction.

As illustrated in FIGS. 13A and 13B, the second hole 67b has an inner diameter greater than the inner diameter of the first hole 57b. The inner diameter of the second hole 67b is greater than the outer diameter of the support 5. As illustrated in FIG. 13A, when the weight 7 is positioned at the first position on the head 13a side, the contact surface 67a2 of the second body 67a is contact with the restricting portion 109. In this case, the lower surface 67al of the second body 67a is spaced apart from the restricting portion 109 in the up-down direction. In this state, the support 5 is positioned upward within the second hole 67b.

As illustrated in FIG. 13B, when the weight 107 is positioned at the second position on the tail 13b side, the lower surface 67al of the second body 67a is contact with the first lower surface 113a of the main body 113. In this state, the support 5 is positioned downward within the second hole 67b.

(Restricting Portion)

As illustrated in FIGS. 12, 13A, and 13B, the restricting portion 109 is positioned on the inner surface of the main body 113. The restricting portion 109 includes an inclined plane 109a (an example of a slope). The inclined plane 109a restricts the weight 107 from moving rearward through sliding resistance against the sliding portion 67.

The inclined plane 109a is arranged between the first lower surface 113a of the main body 113 and the second lower surface 113b of the main body 113 in the front-rear direction. The first lower surface 113a is formed by the upper surface of the second hook-eye storage 41 and extends in the front-rear direction.

The second lower surface 113b also extends in the front-rear direction and is positioned in front of the first lower surface 113a. The rear end of the second lower surface 113b is located below the front end of the first lower surface 113a. The inclined plane 109a extends upward from the front end of the second lower surface 113b toward the rear end of the first lower surface 113a.

In other words, the inclined plane 109a inclines from the front end of the first lower surface 113a toward the outer surface of the main body 113. In this embodiment, the inclined plane 109a is formed by the front surface of the second hook-eye storage 41.

In the lure 101 with the above configuration, the weight 107 moves along the support 5 in the front-rear direction between the front and rear portions of the body 103 while being supported by the support 5. Specifically, the weight 107 moves along the support 5 in the front-rear direction between a first position on the head 13a side (see the solid line in FIG. 12) and a second position on the tail 13b side (see the two-dot dashed line in FIG. 12).

As illustrated in FIG. 13A, when the weight 107 is at the first position on the head 13a side, the contact surface 67a2 of the sliding portion 67 of the weight 107 is in contact with the inclined plane 109a of the restricting portion 109. In this state, when a backward force is applied to the weight 107, the backward movement of the weight 107 is restricted through sliding resistance between the contact surface 67a2 of the sliding portion 67 and the inclined plane 109a of the restricting portion 109.

Thus, in lure 1, the restricting portion 109 on the body 3 facilitates restriction of the backward movement of the weight 107. In other words, in lure 1, a simple structure stabilizes the center of gravity while the lure is moving through the water.

In addition, the sliding portion 67 of lure 101 includes a second body 67a and a second hole 67b. The second hole 67b has an inner diameter greater than the outer diameter of the shaft-shaped support 5. With this configuration, where the inner diameter of the second hole 67b is greater than the outer diameter of the support, the sliding portion 67 can move easily in the transverse direction. The second hole 67b may be an elongated hole extending in the transverse direction. For example, the elongated hole may extend in the up-down direction. The elongated hole preferably has an elliptical cross section.

REFERENCE SIGNS LIST 1, 101 lure
3, 103 Body
5 Support
7, 107 Weight
9, 109 Restricting portion
109a Inclined plane
9a Recess
10 Magnet
11 Urging member
13, 113 Main body
13a Head
13b Tail
17 First slot
57 Weight body
67 Sliding portion
67a Second body of sliding portion
67b Second hole in sliding portion
The invention claimed is:

1. A lure, comprising:
a body including a head in a front portion and a tail in a rear portion;
a support extending in a front-rear direction inside the body;
a weight supported by the support so as to be movable in the front-rear direction, wherein at least part of the weight is movable in a transverse direction that intersects the front-rear direction;
an urging member for urging the weight at least forward; and
a restricting portion positioned on an inner lateral surface of the body in the front portion of the body and configured to limit the weight from moving rearward, the restricting portion being configured such that the weight is at least partially received in and is thereby restricted by the restricting portion to the front portion of the body when at least part of the weight moves in the transverse direction.

2. The lure according to claim 1, wherein the support is supported by the body so as to be movable in the transverse direction.

3. The lure according to claim 2, wherein
the support is an axial member, and
the axial member oscillates around the tail side as an oscillation center.

4. The lure according to claim 3, wherein
the axial member includes a front-end portion on the head side and a rear-end portion on the tail side, the rear-end portion being supported by the body to be able to oscillate, and
the body has a groove for guiding the front-end portion in the transverse direction.

5. The lure according to claim 1, wherein
the support is supported by the body so as to be movable in the transverse direction, and
the weight is restricted by the restricting portion when the support moves in the transverse direction.

6. The lure according to claim 5, wherein the restricting portion is a recess formed on the inner lateral surface of the body.

7. The lure according to claim 6, further comprising:
a magnet positioned on the body so as to face the recess with the support in between, wherein
the weight is at least partially comprised of magnetic material.

8. The lure according to claim 7, wherein
the support is an axial member, and
the axial member oscillates around the tail side as an oscillation center.

9. The lure according to claim 1, wherein
the weight includes a weight body and a sliding portion,
the restricting portion includes a slope that inclines toward an outer surface of the body, and
when at least part of the weight moves in the transverse direction, the sliding portion contacts the slope, and the slope restricts the weight from moving rearward through sliding resistance against the sliding portion.

10. The lure according to claim 9, wherein
the support is an axial member,
the sliding portion includes a main body and a hole in the main body through which the axial member is inserted, and
the hole has an inner diameter greater than an outer diameter of the axial member.

* * * * *